US011835627B2

(12) United States Patent
Tan et al.

(10) Patent No.: US 11,835,627 B2
(45) Date of Patent: Dec. 5, 2023

(54) IMAGE CAPTURING METHOD AND DEVICE

(71) Applicant: WeRide Corp., Sunnyvale, CA (US)

(72) Inventors: Junhua Tan, Sunnyvale, CA (US);
Fengzhi Wu, Sunnyvale, CA (US);
Liren Xu, Sunnyvale, CA (US);
Renfeng Zuo, Sunnyvale, CA (US);
Kerry Shu, Sunnyvale, CA (US);
Junping Xie, Sunnyvale, CA (US);
Yin-Min Huang, Sunnyvale, CA (US)

(73) Assignee: WERIDE CORP., San Jose, CA (US)

( * ) Notice: Subject to any disclaimer, the term of this patent is extended or adjusted under 35 U.S.C. 154(b) by 687 days.

(21) Appl. No.: 16/920,763

(22) Filed: Jul. 6, 2020

(65) Prior Publication Data

US 2021/0003710 A1 Jan. 7, 2021

Related U.S. Application Data

(60) Provisional application No. 62/870,820, filed on Jul. 5, 2019.

(51) Int. Cl.
*G01S 17/89* (2020.01)
*H04N 25/40* (2023.01)
*G01S 17/46* (2006.01)

(52) U.S. Cl.
CPC .............. *G01S 17/89* (2013.01); *G01S 17/46* (2013.01); *H04N 25/41* (2023.01)

(58) Field of Classification Search
CPC .......... G01S 17/89; G01S 17/46; H04N 25/41
See application file for complete search history.

(56) References Cited

U.S. PATENT DOCUMENTS

| | | | | |
|---|---|---|---|---|
| 9,651,658 | B2* | 5/2017 | Pennecot | G01S 17/89 |
| 10,176,596 | B1* | 1/2019 | Mou | G01S 17/89 |
| 10,498,963 | B1* | 12/2019 | Sorgi | G06T 7/13 |
| 11,555,903 | B1* | 1/2023 | Kroeger | G05D 1/0274 |
| 2008/0208455 | A1* | 8/2008 | Hartman | G01C 21/005 340/988 |
| 2018/0156896 | A1* | 6/2018 | O'Keeffe | G01S 17/10 |
| 2019/0052844 | A1* | 2/2019 | Droz | G01S 17/87 |
| 2019/0098233 | A1* | 3/2019 | Gassend | G06T 7/521 |
| 2019/0179320 | A1* | 6/2019 | Pacala | G05D 1/0214 |
| 2020/0174107 | A1* | 6/2020 | Briggs | G06T 7/50 |

* cited by examiner

*Primary Examiner* — Isam A Alsomiri
*Assistant Examiner* — Joseph C Fritchman
(74) *Attorney, Agent, or Firm* — Jun He Law Offices P.C.; James J. Zhu (57) ABSTRACT

An image capturing method, comprising: scanning with a light detection and ranging (LIDAR) sensor an environment of the LIDAR sensor, wherein the LIDAR sensor progressively rotates about a rotation axis at a step angle, and when scanning each step angle the LIDAR sensor generates a point cloud of a portion of the environment in a predetermined pattern; scanning with an image sensor assembly mechanically coupled to the LIDAR sensor the environment in synchronization with the scanning by the LIDAR sensor to generate on an imaging plane of the image sensor assembly a sequence of image pixel rows of a portion of the environment corresponding to the point cloud of the portion of the environment; and combining the point cloud with the sequence of image pixel rows for the scanning of each step angle to obtain a fused image of the portion of the environment.

19 Claims, 4 Drawing Sheets

IMAGE CAPTURING METHOD AND DEVICE

TECHNICAL FIELD

The application generally relates to image capturing technology, and more particularly, to an image capturing method and device.

BACKGROUND 360-degree light detection and ranging (LIDAR) sensors and 360-degree view image sensors are used to get information regarding a surrounding environment of an object mounted with such sensors. For example, the LIDAR and image sensors can be mounted on a vehicle to identify objects on the roads and to localize the vehicle relative to the surrounding environment. Point clouds collected by the LIDAR sensors and images collected by the image sensors are often fused together to generate a three-dimensional view of the objects and the surrounding environment.

However, since the vehicles are generally moving at a high speed and the capturing of the point clouds and the images may not synchronize with each other, a timing difference between the point clouds and the images may lead to unsuccessful fusion thereof.

Thus, there is a continued need for further improvement.

SUMMARY

An objective of the application is to provide an image capturing method and apparatus for improving synchronization between measurements from LIDAR sensors and images sensors.

In a first aspect of the application, there is provided an image capturing method, comprising: scanning with a light detection and ranging (LIDAR) sensor an environment of the LIDAR sensor, wherein the LIDAR sensor progressively rotates about a rotation axis at a step angle, and the LIDAR sensor generates a point cloud of a portion of the environment in a predetermined pattern when scanning each step angle; scanning with an image sensor assembly the environment in synchronization with the scanning by the LIDAR sensor to generate on an imaging plane of the image sensor assembly a sequence of image pixel rows of a portion of the environment corresponding to the point cloud of the portion of the environment, wherein the image sensor assembly is mechanically coupled to the LIDAR sensor; and combining the point cloud with the sequence of image pixel rows for the scanning of each step angle to obtain a fused image of the portion of the environment.

In some embodiments, each of the sequence of image pixel rows is parallel with the rotation axis.

In some embodiments, when scanning each step angle the LIDAR sensor fires a laser beam to a portion of the environment corresponding to the step angle on a non-linear basis.

In some embodiments, before scanning with a LIDAR sensor and scanning with an image sensor assembly, the method further comprises: aligning the LIDAR sensor with the image sensor assembly in position to reduce an overall mismatch between the predetermined pattern used by the LIDAR sensor and the imaging plane of the image sensor assembly.

In some embodiments, aligning the LIDAR sensor with the image sensor assembly in position comprising: adjusting a position of the predetermined pattern of the LIDAR sensor relative to the imaging plane of the image sensor assembly; generating a plurality of pairs of sample point cloud and sample sequence of image pixel rows for a plurality of positions of the predetermined pattern of the LIDAR sensor relative to the imaging plane of the image sensor assembly; determining, for each of the plurality of pairs of sample point cloud and sample sequence of image pixel rows, a sum of spatial or time differences between the LIDAR pixels of the predetermined pattern and the respective image pixels of the imaging plane; and determining that the LIDAR sensor is aligned with the image sensor assembly in position in response to that a pair of sample point cloud and sample sequence of image pixel rows having a smallest value of the sum of spatial or time differences among the plurality of pairs of sample point cloud and sample sequence of image pixel rows.

In some embodiments, the sequence of image pixel rows are high-dynamic-range (HDR) image pixel rows, and each image pixel row is generated through exposure for a first exposure time and at least a second exposure time after the first exposure time.

In some embodiments, the second exposure time is adjacent to the first exposure time.

In some embodiments, the second exposure time is longer than the first exposure time.

In some embodiments, the rotation axis is a vertical axis.

In some embodiments, each two neighboring image pixel rows are generated at a delay based on a time period for scanning a step angle.

In some embodiments, the image sensor assembly comprises multiple images sensors circularly arranged around the rotation axis.

In another aspect of the present application, there is provided an image capturing device, comprising: a light detection and ranging (LIDAR) sensor for scanning an environment, wherein the LIDAR sensor is configured to progressively rotate about a rotation axis at a step angle, and to generate a point cloud of a portion of the environment when scanning each step angle; an image sensor assembly mechanically coupled to the LIDAR sensor and for scanning the environment in synchronization with the scanning by the LIDAR sensor, wherein the image sensor assembly is configured to generate a sequence of image pixel rows of a portion of the environment corresponding to the point cloud of the portion of the environment; and a controller for combining the point cloud with the sequence of image pixel rows for the scanning of each step angle to obtain a fused image of the environment.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Figure 1:
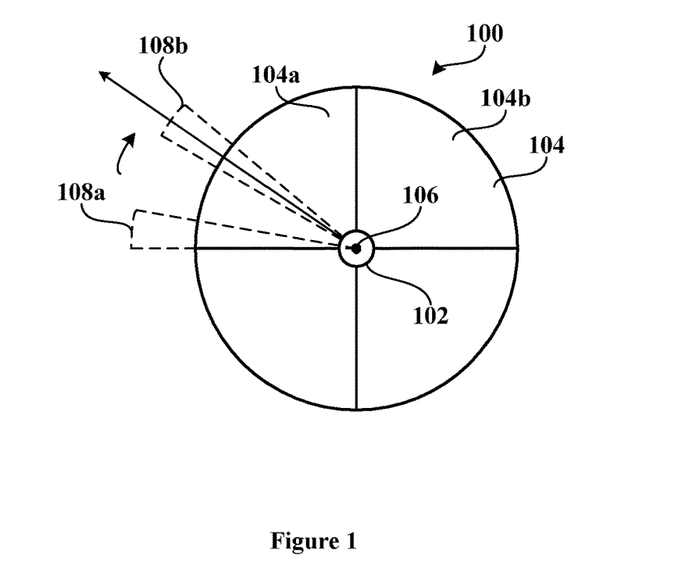
FIG. 1 illustrates a top view of a sensor assembly according to an embodiment of the present application.

FIG. 1 illustrates a top view of an image capturing device 100 according to an embodiment of the present application.

As shown in FIG. 1, the image capturing device 100 includes a LIDAR sensor 102, and an image sensor assembly 104 mechanically coupled to the LIDAR sensor 102. In some embodiments, the image sensor assembly 104 may be fixed onto the LIDAR sensor 102, for example, secured onto a bottom side of LIDAR sensor 102. In some other embodiments, the LIDAR sensor 102 and the image sensor assembly 104 may be separated from each other but both be fixed onto a carrier such as a vehicle or a helmet. The image capturing device 100 can detect an environment of the carrier to identify objects and some other factors or features in the environment, for example, through posting processing such as image recognition.

The LIDAR sensor 102 can progressively or stepwise rotate, either clockwise or counterclockwise, about a rotation axis 106 at a step angle, such that the LIDAR sensor 102 can scan the environment in a span of each step angle. For example, the LIDAR sensor 102 can rotate at a step angle of 10 degrees to complete a 360-degree scan of the environment in 36 steps. In the embodiment shown in FIG. 1, the LIDAR sensor 102 may start scanning the environment from a first angular span 108a, and after one or more step angles, to scan a second angular span 108b. During the scanning operation, the LIDAR sensor may first be directed to an angular direction relative to the imaging capturing device, and then scan the portion of the environment at the angular direction by firing a laser beam and receiving the reflected laser beam. Afterwards, the LIDAR sensor 102 may continue to scan the environment in each of the angular spans subsequent to the second angular span 108b, and repeat the above process. It can be appreciated that, compared with a motion speed of the carrier such as a vehicle moving at a speed of 70 miles per hour, the LIDAR sensor 102 may stay for a very short period during each step to implement the environment scanning. In some embodiments, the LIDAR sensor 102 may stay for about 10 to 100 milliseconds during each step. Thus, the LIDAR sensor 102 as well as the image sensor 104 may generally be considered to be stationary relative to the environment and most objects in the environment during scanning of each angular span.

Figure 2:
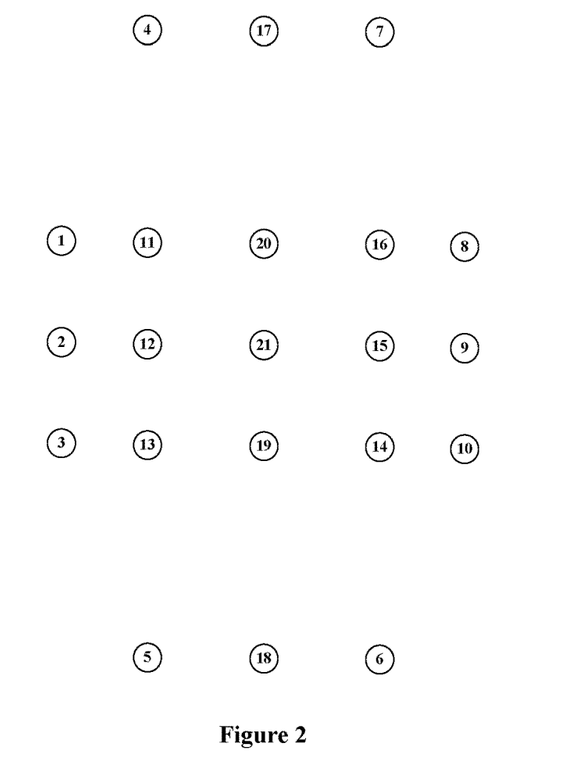
FIG. 2 illustrates a pattern of a point cloud generated by a LIDAR sensor according to an embodiment of the present application.

When scanning an angular span, the LIDAR sensor 102 may generate a point cloud of a portion of the environment in a predetermined pattern. FIG. 2 illustrates an exemplary pattern of a point cloud generated by a LIDAR sensor according to an embodiment of the present application.

As shown in FIG. 2, the LIDAR sensor may not fire laser to the environment on a linear basis (e.g., a row-by-row basis or a column-by-column basis). In the embodiment, a point cloud of 21 points can be generated according to the firing positions of the LIDAR sensor. The 21 points are distributed in a generally cross-like pattern. Moreover, a laser beam fired by the LIDAR sensor may jump back and forth between different rows or columns during the scanning. For example, the laser beam from the LIDAR sensor may be fired to point 5 and then to point 6 which is not adjacent to point 5. Furthermore, the laser beam may be fired to point 7 and then to point 8 which is not in the same row or column as point 7. In other words, the laser firing of the LIDAR sensor is in an irregular pattern from either spatial or time perspective. It should be noted that the point cloud pattern illustrated in FIG. 2 is exemplary and can vary depending on different detection requirements or design needs. It can also be appreciated that the point could pattern may be on a linear basis such as a regular row-by-row or column-by-column basis in some other embodiments.

With continued reference to FIG. 1, the image sensor assembly 104 includes four image sensors each for scanning an individual 90-degree range of the environment. It can be appreciated that the image sensor assembly 104 may include one, two, three, five, six or any other number of image sensors. In some embodiments, the image sensors may be circularly arranged around the rotation axis 106. The image sensor assembly 104 operates in synchronization with the scanning by the LIDAR sensor 102. Specifically, when an angular span, e.g. the angular span 108b, is being scanned by the LIDAR sensor 102, an image sensor 104a of the image sensor assembly 104 which has a 90-degree detection scope that covers the angular span 108b being scanned may operate to collect images, while the other three image sensors of the image sensor assembly 104 may not operate to collect images.

As show in FIG. 1, when the LIDAR sensor 102 is scanning the angular span 108b, the image sensor assembly 104 may synchronically scan the angular span 108b on a row-by-row basis, to generate on an imaging plane of the image sensor assembly 104 a sequence of image pixel rows of the portion of the environment. The imaging plane may correspond to two or more rows which are adjacent to each other. Each row of the image pixels may be in parallel with the rotation axis 106 about which the LIDAR 102 rotates. As such, the sequence of image pixel rows may be corresponding to the point cloud of the portion of the environment being scanned by the LIDAR sensor 102. In some embodiments, the rotation axis 106 is a vertical axis.

Figure 3:
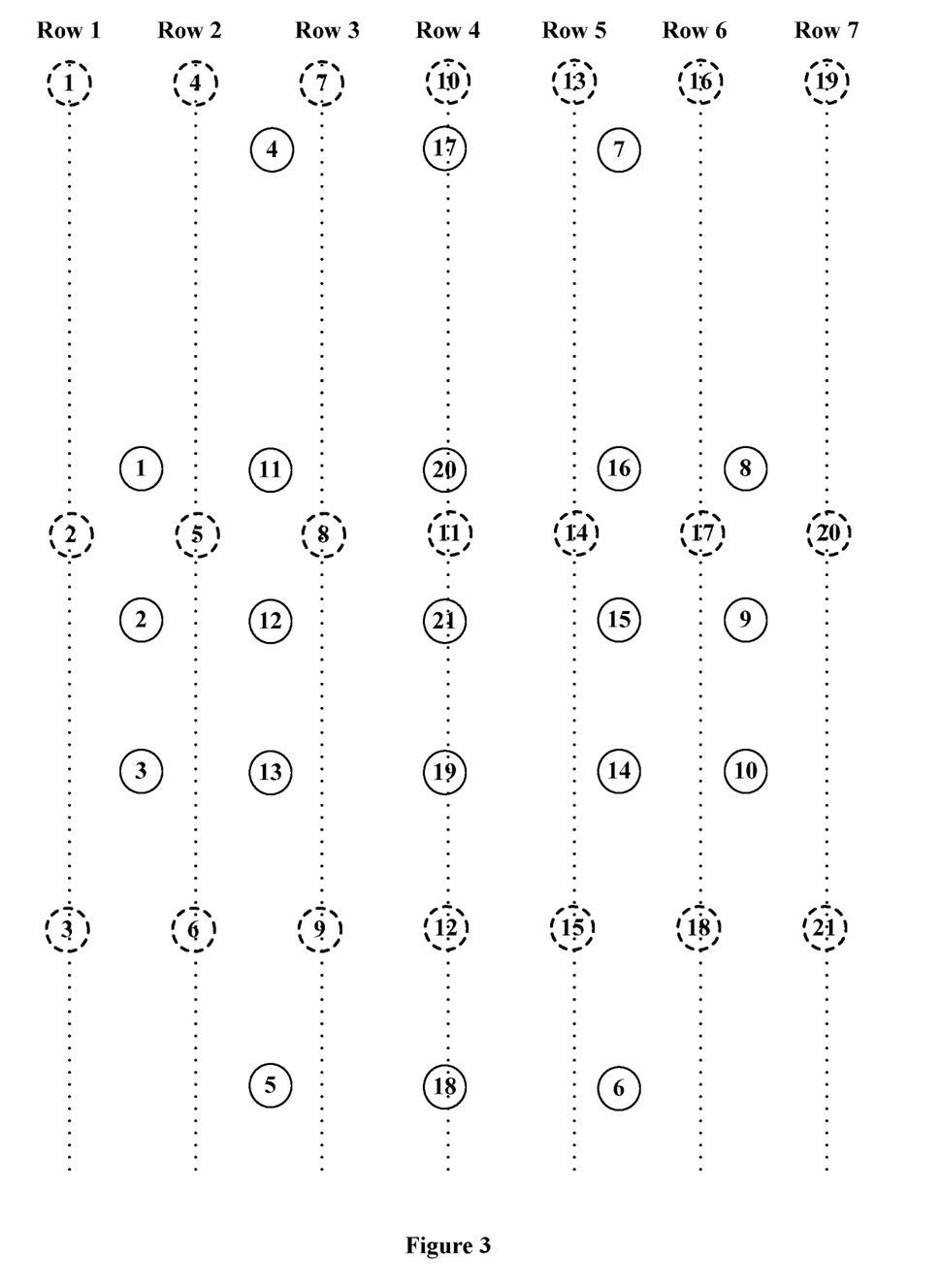
FIG. 3 shows an exemplary position relationship between a point cloud and a sequence of image pixel rows.

FIG. 3 shows an exemplary position relationship between a point cloud and a sequence of image pixel rows. As illustrated in FIG. 3, the sequence of image pixel rows includes seven rows, i.e. row 1 to row 7. It can be appreciated that the number of rows is exemplary and for illustration purpose only, and the image pixels can be arranged in other regular patterns. Specifically, the generation of the image pixel rows starts from row 1, and a dashed circle 1 at the beginning of row 1 indicates that when the image pixel there is being collected the laser beam of the LIDAR sensor is also fired at point 1 (marked by a solid circle). Similarly, a dashed circle 2 in row 1 indicates that when the image pixel there is being collected the laser beam of the LIDAR sensor is fired at point 2. A dashed circle 21 in row 7 indicates that when the image pixel there is being collected the laser beam of the LIDAR sensor is fired at point 21. As can be seen from FIG. 3, although the points in the point cloud generated by the LIDAR sensor may not ideally match the pixels in the image pixel rows in position, the point cloud and the image pixel rows overall match with each other when each angular span is being scanned, since the two are both for the imaging of the portion of environment of the angular span. Therefore, the overall mismatch between the points of the point cloud and the image pixels can be maintained to a significantly low level which may be sufficient for further image fusion or combination. Theoretically, a maximum mismatch between a point of the point cloud and an image pixel of the pixel rows is smaller than a diagonal length of the point cloud pattern. Moreover, considering that most objects on the roads are moving horizontally rather than moving vertically, the maximum mismatch is probably less than the step angle of the LIDAR sensor if measured in form of angle.

The scanning by the image sensor assembly 104 may be controlled through a rolling shutter which can be either mechanical or electronic. In some embodiments, the timing of a sampling circuit for an image array of the image sensor assembly 104 may be configured based on a time period for scanning a step angle by the LIDAR sensor 102. For example, if it takes 35 milliseconds for the LIDAR sensor 102 to scan a step angle, then the image sensor assembly 104 may spend 5 milliseconds to generate an image pixel row, or 35 milliseconds to generate seven image pixel rows, for the example shown in FIG. 3. In other words, each two neighboring image pixel rows are generated at a delay based on a time period for scanning a step angle by the LIDAR sensor 102 since synchronization between the two types of sensors is desired. It should be noted that the image sensor assembly 104 may generate another number of image pixel rows, such as 10 to 1000 rows or more, depending on a physical resolution of the image sensor assembly, and accordingly, one or more rows can be uniformly distributed in a manner similar to that shown in FIG. 3.

In some embodiments, two adjacent image sensors of the image sensor assembly 104, e.g. the image sensors 104a and 104b, may have overlapping detection ranges at their border. In other words, a first row of the image sensor 104b may start detection before a last row of the image sensor 104a stop detection. In that case, the overlapping between adjacent image sensors may be taken into account when determining the timing of the image sensors. In some embodiments, the detection results of the overlapping region by the two adjacent image sensors may be both used in generating the fused image, along with the detection result from the LIDAR sensor 102.

In some embodiments, the image sensor assembly 104 can be triggered to start detection by the LIDAR sensor, either based on a rotational angle or speed of the LIDAR sensor 102 or based on an indirect timing signal which reflects the progressive detection of the LIDAR sensor 102. In some embodiments, a sensor for sensing the rotational angle of the LIDAR sensor 102 may be used to generate the trigger signal. In some other embodiments, a counter for counting the LIDAR sensor's timing may be used to generate the trigger signal. Upon receiving the trigger signal, an image sensor of the image sensor assembly 104 may start image collection accordingly.

The image capturing device 100 may further include a controller (not shown) for combining the point cloud with the sequence of image pixel rows for the scanning of each step angle to obtain a fused image of a portion of the environment being scanned. Moreover, the controller may further combine the fused images of various portions of the environment to obtain a 360-degree image of the environment. The controller can be communicatively coupled to the LIDAR sensor 102 and the image sensor assembly 104 to receive detection results from the sensors. In some embodiments, the controller may further generate respective control signals for controlling the operation of the sensors. It can be readily appreciated that the controller can be implemented by either of hardware, software, firmware or any combination thereof.

Figure 4:
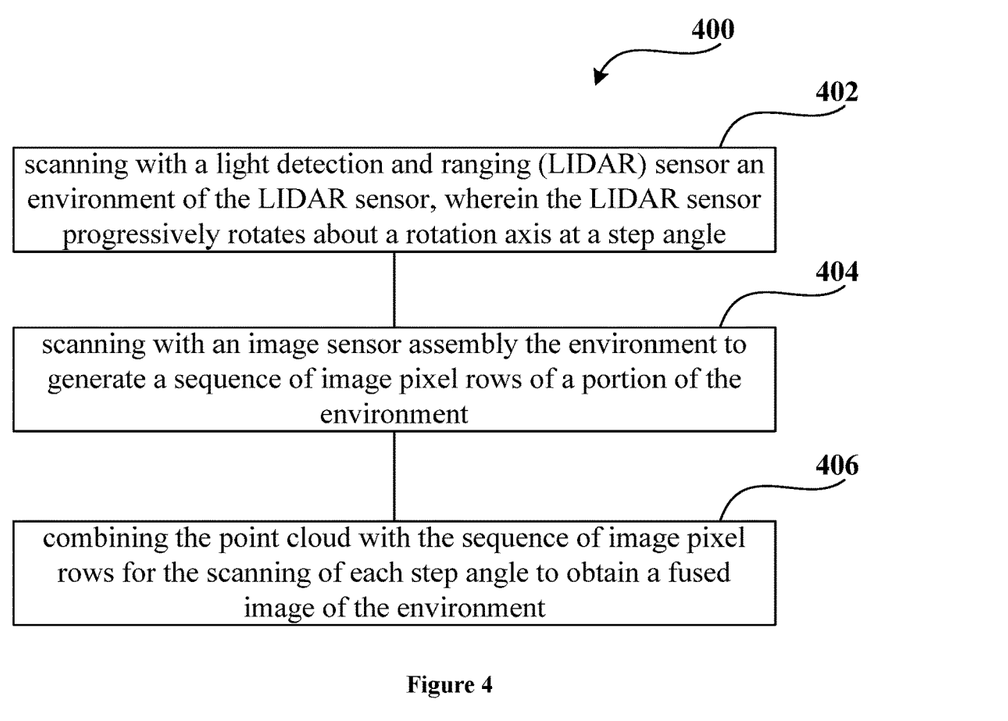
FIG. 4 illustrates an image capturing method according to an embodiment of the present application.

FIG. 4 illustrates an image capturing method 400 according to an embodiment of the present application. The method can be implemented by the image capturing device 100 shown in FIG. 1, for example.

As shown in FIG. 4, in step 402, a LIDAR sensor scans an environment where it is located. The LIDAR sensors progressively rotates about a rotation axis at a step angle, and when scanning each step angle, the LIDAR sensor generates a point cloud of a portion of the environment to which it is directed.

In step 404, an image sensor assembly which is mechanically coupled to the LIDAR sensor scans the environment in synchronization with the scanning by the LIDAR sensor. When scanning each step angle, the image sensor assembly may generate a sequence of image pixel rows of a portion of the environment corresponding to the point cloud of the portion of the environment. In some embodiments, the portion of the environment can be the same or substantially the same as that the LIDAR sensor is being directed to in step 402.

In step 406, for the scanning of each step angle, the point cloud is combined with the sequence of image pixel rows to obtain a fused image of the environment. The fusion can be performed by a controller using any suitable image fusing algorithms.

As mentioned above, the maximum mismatch between a point of the point cloud and an image pixel of the pixel rows is smaller than a diagonal length of the point cloud pattern. Thus, it may still be desired to further align the LIDAR sensor with the image sensor assembly in position before the scanning steps. An optimized alignment between the LIDAR sensor with the image sensor assembly can further reduce an overall mismatch between the predetermined pattern used by the LIDAR sensor and the imaging plane of the image sensor assembly. Specifically, the overall mismatch may refer to a sum of spatial differences between the LIDAR pixels or detection points and the respective image pixels of the imaging plane, or a sum of time differences between detection of the LIDAR pixels or detection points and the respective image pixels of the imaging plane, in some embodiments.

Still referring to FIG. 3, the pattern of the point cloud is at a position relative to the imaging plane of the sequence of image pixel rows. In such case, the sum of the spatial differences can be calculated by adding the spatial Euclidian distances between the LIDAR pixels and the respective image pixels at all the firing moments. For example, a first spatial distance between solid circle 1 and dashed circle 1 (which are detected at the same moment), a second spatial distance between solid circle 2 and dashed circle 2, a third spatial distance between solid circle 3 and dashed circle 3, . . . and a twenty-first spatial distance between solid circle 21 and dashed circle 21 can be added together to obtain the sum of spatial differences. Alternatively, the sum of the time differences can be calculated by adding together each time difference between when an area of the environment is detected by the LIDAR sensor and when the same area is detected by the image sensor assembly.

Figure 6:
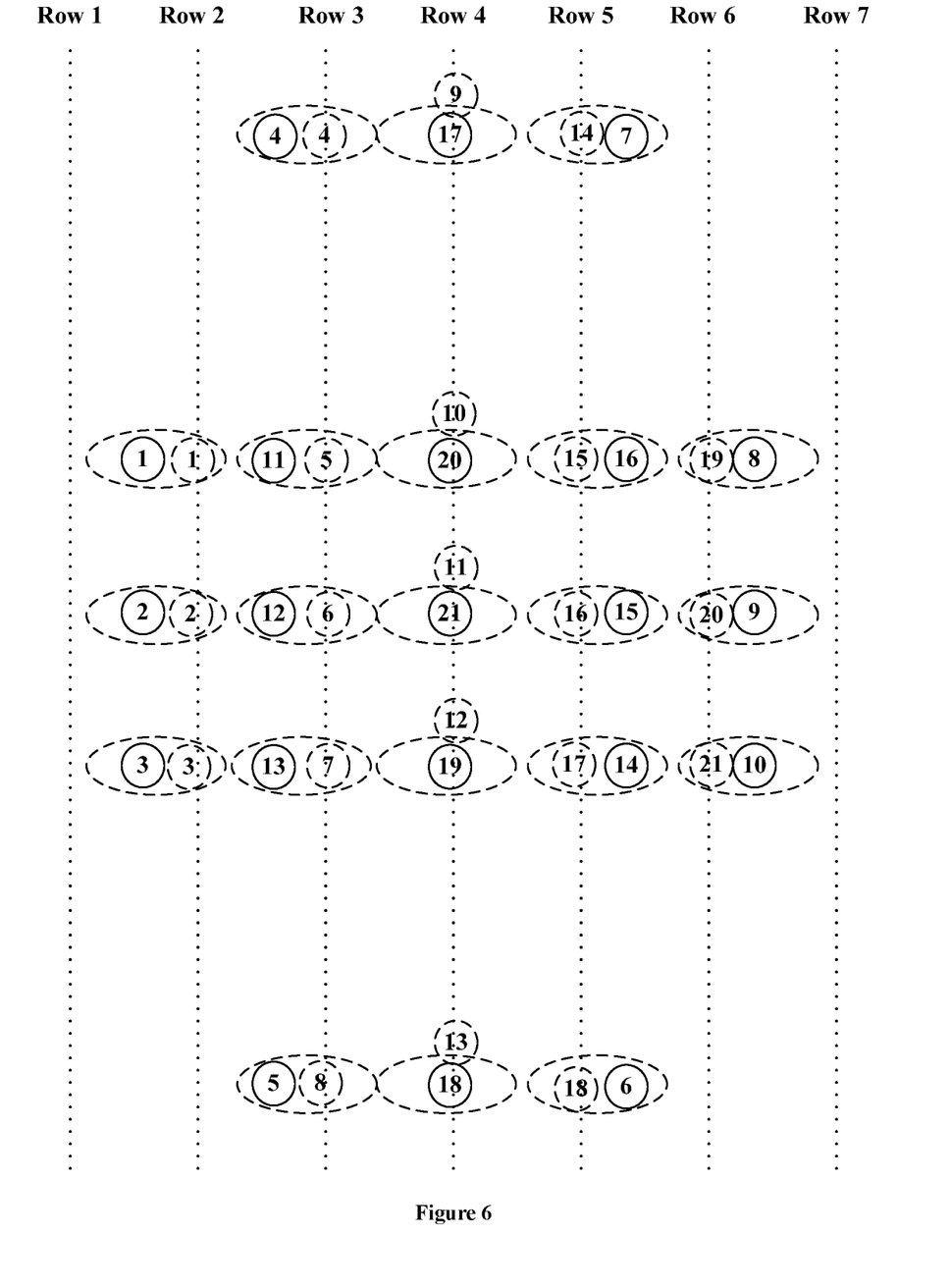
FIG. 6 shows an exemplary position relationship between a point cloud and a sequence of image pixel rows.

In another example shown in FIG. 6, each dashed oval shows an area of the environment being detected, with each solid circle illustrating detection by a LIDAR pixel and each dashed circle illustrating detection by an image pixel or a group of image pixels. The paired LIDAR pixel and image pixel(s) represented in a dashed oval are close or adjacent to each other in position. However, it is not required that the LIDAR pixels and the respective image pixel(s) are strictly aligned with each other in position, and certain offset or deviation in position between the two are allowed. For example, the LIDAR pixel represented by solid circle 1 may be directed to a position several image pixels away from the image pixels represented by dashed circle 1. As shown in FIG. 6, a portion of a dashed circle 9 is out of a dashed oval where a solid circle 17 is in. Furthermore, either one of the paired LIDAR pixel and image pixels represented in a dashed oval may have a bigger size than the other one of the pair. Moreover, the paired LIDAR pixel and image pixels represented in a dashed oval may partially overlap with each other. It can be appreciated that other arrangement and positional relationship between the LIDAR pixel and the corresponding image pixel(s) can be set according to actual needs. When calculating the mismatch for a sensor with the pattern shown in FIG. 6, a first time difference between the detection times of solid circle 1 and dashed circle 1, a second time difference between the detection times of solid circle 2 and dashed circle 2 . . . a fifth time difference between the detection times of solid circle 11 and dashed circle 5 . . . and a twenty-first time difference between the detection times of solid circle 21 and dashed circle 10 can be added together to obtain the sum of time differences.

The inventors found that the relative position between the pattern of the point cloud and the imaging plane of the sequence of image pixel rows may affect the sum of the spatial differences and the sum of the time difference. As such, the pattern of the point cloud may be adjusted relative to the imaging plane in position (e.g. move upward, downward, leftward or right ward in the direction shown in FIG. 3) to get a better alignment therebetween, thereby reducing the overall mismatch between the predetermined pattern used by the LIDAR sensor and the imaging plane of the image sensor assembly.

In some embodiments, aligning the LIDAR sensor with the image sensor assembly in position may comprise: adjusting a position of a predetermined pattern of the LIDAR sensor relative to the imaging plane of the image sensor assembly, either by moving the LIDAR sensor's orientation or moving the orientation of one or more image sensors of the image sensor assembly; generating a plurality of pairs of sample point cloud and sample sequence of image pixel rows for a plurality of positions of the predetermined pattern of the LIDAR sensor relative to the imaging plane of the image sensor assembly, wherein the plurality of positions can be determined by the aforementioned adjusting step; determining, for each of the plurality of pairs of sample point cloud and sample sequence of image pixel rows, a sum of spatial or time differences between the LIDAR pixels of the predetermined pattern and the respective image pixels of the imaging plane; and determining that the LIDAR sensor is aligned with the image sensor assembly in position in response to that a pair of sample point cloud and sample sequence of image pixel rows having a smallest value of the sum of spatial or time differences among the plurality of pairs of sample point cloud and sample sequence of image pixel rows. The sum of spatial or time differences and comparison among various sums for the plurality of positions can be implemented through calculation. In some embodiments, the aligning operation can be performed prior to the scanning steps such as steps 402 and 404 shown in FIG. 4.

The device and method shown in FIGS. 1 and 4 can reduce mismatches between the detection results of the LIDAR sensor and the image sensor assembly, as is described above. However, it may be further needed if the images captured by the image sensor assembly can have a high dynamic range.

Figure 5:
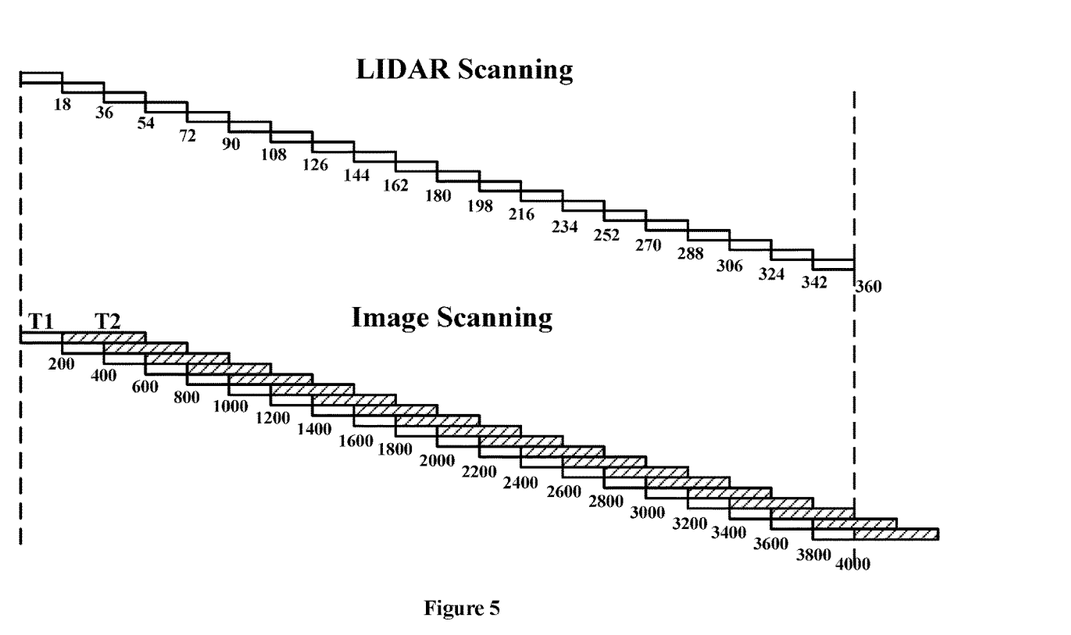
FIG. 5 illustrates a timing diagram for generating high-dynamic-resolution (HDR) images according to an embodiment of the present application.

FIG. 5 illustrates a timing diagram for generating high-dynamic-range (HDR) images according to an embodiment of the present application.

As shown in FIG. 5, for a 360-degree scanning of the environment, the LIDAR scanning may rotate at a step angle of 18 degrees, i.e. the 360-degree scanning can be implemented within 20 steps. In synchronization with the scanning of the LIDAR sensor, the image sensor assembly may in total have 4000 vertical rows. In that case, in accordance with the scanning of each step angle, a sequence of 200 image pixel rows may be generated by the image sensor assembly.

In order to achieve HDR performance, the image sensor assembly may be exposed for a first exposure time T1 and at least a second exposure time T2 which is subsequent to the first exposure time T1. The first sequence of 200 image pixel rows (row 1 to row 200) may be generated based on the detection results during the first exposure time T1 and the second exposure time T2. The extended exposure time provides better HDR performance for the image sensor assembly. It can be appreciated by those skilled in the art that the image sensor assembly may be exposed for more exposure time such as a third exposure time subsequent to the second exposure time (not shown), or a fourth exposure time, to obtain an HDR image with better HDR performance.

In some embodiments, the second exposure time can be adjacent to the first exposure time, as is shown in FIG. 5. In other words, when rows 1 to 200 are being exposed for image capturing during their second exposure time, rows 201 to 400 may be being exposed for image capturing during their first exposure time. In some embodiments, the second exposure time may be longer than the first exposure time, and accordingly, when rows 1 to 200 are being exposed for image capturing during their second exposure time, rows 201 to 400 and adjacent rows 401 to 600 (or more others later) may be exposed for image capturing during their respective first exposure times. Since the first exposure time and the second exposure time for each 200 rows of the image sensor assembly are close to each other, the movement of a carrier carrying the image capturing device which has the LIDAR sensor and the image sensor assembly may be considered to be static during the first and second exposure times and would not significantly affect the imaging performance.

In the embodiment shown in FIG. 5, a starting time of the first exposure time T1 for generating images pixel rows 1 to 200 by the image sensor assembly is aligned with a starting time of scanning the angular span of 0 to 18 degrees by the LIDAR sensor. In some other embodiment, the two starting times may not be aligned with each other. For example, the starting time of the first exposure time T1 may be a short period (e.g. 1/10 to 1/2 of the first exposure time) ahead of the starting time of scanning by the LIDAR sensor. In some other embodiments, the starting time of the second exposure time T2 for generating images pixel rows 1 to 200 by the image sensor assembly may be aligned with the starting time of scanning the angular span of 0 to 18 degrees by the LIDAR sensor. The timing for scanning and imaging other angular spans may be similar. Such arrangement can still mitigate mismatches between the point clouds and the corresponding image pixels since they are still close to each other from timing perspective.

In some embodiments, the HDR image generating method shown in FIG. 5 can be combined with the image capturing method shown in FIG. 4. For example, an image capturing device can be pre-calibrated using the image capturing method shown in FIG. 4 and then perform the method shown in FIG. 5. Furthermore, only detection results generated during when both of the LIDAR sensor and the image sensor assembly are detecting the same portion of the environment, such as the first exposure times shown in FIG. 5, may be used in the calibration.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. An image capturing method, comprising:
scanning with a light detection and ranging (LIDAR) sensor an environment of the LIDAR sensor, wherein the LIDAR sensor progressively rotates about a rotation axis at a step angle, and the LIDAR sensor generates a point cloud of a portion of the environment in a predetermined pattern when scanning each step angle;
scanning with an image sensor assembly the environment in synchronization with the scanning by the LIDAR sensor to generate on an imaging plane of the image sensor assembly a sequence of image pixel rows of a portion of the environment corresponding to the point cloud of the portion of the environment, wherein the image sensor assembly is mechanically coupled to the LIDAR sensor; and
combining the point cloud with the sequence of image pixel rows for the scanning of each step angle to obtain a fused image of the portion of the environment;
wherein when scanning each step angle the LIDAR sensor fires a laser beam to a portion of the environment corresponding to the step angle on a non-linear basis, and combining the point cloud with the sequence of image pixel row for the scanning of each step angle to obtain a fused image of the portion of the environment comprises:
adjusting an irregular pattern of the point cloud relative to the imaging plane of the sequence of image pixel rows in position to reduce the sum of time difference and the sum of the spatial differences between the LIDAR pixels of the irregular pattern and the respective image pixels of the imaging plane.

2. The method of claim 1, wherein each of the sequence of image pixel rows is parallel with the rotation axis.

3. The method of claim 1, wherein before scanning with a LIDAR sensor and scanning with an image sensor assembly, the method further comprises:
aligning the LIDAR sensor with the image sensor assembly in position to reduce an overall mismatch between the predetermined pattern used by the LIDAR sensor and the imaging plane of the image sensor assembly.

4. The method of claim 3, wherein
aligning the LIDAR sensor with the image sensor assembly in position comprising:
adjusting a position of the predetermined pattern of the LIDAR sensor relative to the imaging plane of the image sensor assembly;
generating a plurality of pairs of sample point cloud and sample sequence of image pixel rows for a plurality of positions of the predetermined pattern of the LIDAR sensor relative to the imaging plane of the image sensor assembly;
determining, for each of the plurality of pairs of sample point cloud and sample sequence of image pixel rows, a sum of spatial or time differences between the LIDAR pixels of the predetermined pattern and the respective image pixels of the imaging plane; and
determining that the LIDAR sensor is aligned with the image sensor assembly in position in response to a pair of sample point cloud and sample sequence of image pixel rows having a smallest value of the sum of spatial or time differences among the plurality of pairs of sample point cloud and sample sequence of image pixel rows.

5. The method of claim 1, wherein the sequence of image pixel rows are high-dynamic-range (HDR) image pixel rows, and each image pixel row is generated through exposure for a first exposure time and at least a second exposure time after the first exposure time.

6. The method of claim 5, wherein the second exposure time is adjacent to the first exposure time.

7. The method of claim 5, wherein the second exposure time is longer than the first exposure time.

8. The method of claim 1, wherein the rotation axis is a vertical axis.

9. The method of claim 1, wherein each two neighboring image pixel rows are generated at a delay based on a time period for scanning a step angle.

10. The method of claim 1, wherein the image sensor assembly comprises multiple image sensors circularly arranged around the rotation axis.

11. An image capturing device, comprising:
a light detection and ranging (LIDAR) sensor for scanning an environment, wherein the LIDAR sensor is configured to progressively rotate about a rotation axis at a step angle, and to generate a point cloud of a portion of the environment in a predetermined pattern when scanning each step angle;
an image sensor assembly mechanically coupled to the LIDAR sensor and for scanning the environment in synchronization with the scanning by the LIDAR sensor, wherein the image sensor assembly is configured to generate on an imaging plane of the image sensor assembly a sequence of image pixel rows of a portion of the environment corresponding to the point cloud of the portion of the environment; and a controller for combining the point cloud with the sequence of image pixel rows for the scanning of each step angle to obtain a fused image of the portion the environment;

wherein the LIDAR sensor is configured to, when scanning each step angle, fire a laser beam to a portion of the environment corresponding to the step angle on a non-linear basis and combining the point cloud with the sequence of image pixel row for the scanning of each step angle to obtain a fused image of the portion of the environment comprises:

adjusting an irregular pattern of the point cloud relative to the imaging plane of the sequence of image pixel rows in position to reduce the sum of time difference and the sum of the spatial differences between the LIDAR pixels of the irregular pattern and the respective image pixels of the imaging plane.

12. The device of claim 11, wherein each of the sequence of image pixel rows is parallel with the rotation axis.

13. The device of claim 11, wherein the sequence of image pixel rows are high-dynamic-ratio (HDR) image pixel rows, and each image pixel row is generated through exposure for a first exposure time and at least a second exposure time after the first exposure time.

14. The device of claim 13, wherein the second exposure time is adjacent to the first exposure time.

15. The device of claim 13, wherein the second exposure time is longer than the first exposure time.

16. The device of claim 11, wherein the rotation axis is a vertical axis.

17. The device of claim 11, wherein each two neighboring image pixel rows are generated at a delay based on a time period for scanning a step angle.

18. The device of claim 11, wherein the image sensor assembly comprises multiple image sensors circularly arranged around the rotation axis.

19. An image capturing method, comprising:

directing a light detection and ranging (LIDAR) scanning assembly to a first angular direction relative to an autonomous moving vehicle to which the LIDAR scanning assembly is mechanically coupled, scanning a first predetermined two-dimensional angular pattern with the LIDAR scanning assembly an environment of the LIDAR scanning assembly to generate a first point cloud while the LIDAR scanning assembly is directed in the first angular direction, generating a first optical image from the integration of light received by a first subset of rows of an optical sensor array during a first integration period, the first integration period determined at least in part by a timing related to the directing the LIDAR scanning assembly in the first angular direction or to the scanning of the first predetermined two-dimensional angular pattern, the optical sensor array comprising n rows and m columns of optical detector assemblies, where n and m are integers greater than 3, and the first subset consisting of 2 to n−2 rows of the optical sensor array, rotating the LIDAR scanning assembly from the first angular direction to a second angular direction relative to the autonomous moving vehicle, scanning a second predetermined two-dimensional angular pattern with the LIDAR scanning assembly to generate a second point cloud while the LIDAR scanning assembly is rotated in the second angular direction, and generating a second optical image from a second subset of rows, during a second integration time, the second angular direction is different from the first angular direction, wherein the second subset is different from the first subset and consists of 2 to n−2 rows, and the second integration time is different from the first integration time and determined at least in part by a timing related to the directing the LIDAR scanning assembly in the second angular direction or to the scanning of the second predetermined two-dimensional angular pattern, creating a merged three-dimensional representation of the environment based on the combination of data from the first point cloud, the second point cloud, the first optical image, and the second optical image;

wherein when scanning the first predetermined two-dimensional angular pattern, the LIDAR scanning assembly fires a laser beam to a portion of the environment on a non-linear basis, and creating a merged three-dimensional representation of the environment based on the combination of data from the first point cloud, the second point cloud, the first optical image, and the second optical image comprises:

adjusting an irregular pattern of the first point cloud relative to the imaging plane of the first optical image in position to reduce the sum of time difference and the sum of the spatial differences between the LIDAR pixels of the irregular pattern and the respective image pixels of the imaging plane.

* * * * *